United States Patent [19]

Coenen

[11] Patent Number: 5,182,406
[45] Date of Patent: Jan. 26, 1993

[54] PROCESS AND APPARATUS FOR RECOVERING VEGETABLE FATS AND OILS FROM OIL-CONTAINING NATURAL SUBSTANCES

[75] Inventor: Hubert Coenen, Essen, Fed. Rep. of Germany

[73] Assignee: Dorr-Oliver Deutschland GmbH, Grevenbroich, Fed. Rep. of Germany

[21] Appl. No.: 683,501

[22] Filed: Apr. 5, 1991

Related U.S. Application Data

[63] Continuation of Ser. No. 593,303, Oct. 3, 1990, abandoned, which is a continuation of Ser. No. 254,386, Oct. 5, 1988, abandoned.

[30] Foreign Application Priority Data

Oct. 20, 1987 [DE] Fed. Rep. of Germany ....... 3735458

[51] Int. Cl.$^5$ .......................... C09F 5/02; C11B 1/00
[52] U.S. Cl. ........................................ 554/13; 554/12
[58] Field of Search ................. 260/412.4, 412.2, 412; 554/12, 13

[56] References Cited

U.S. PATENT DOCUMENTS

| | | | |
|---|---|---|---|
| 2,840,459 | 6/1958 | Karnofsky | 260/412.4 |
| 3,261,690 | 7/1966 | Wayne | 260/412.4 |
| 4,452,744 | 6/1984 | Finch et al. | 260/412.4 |

FOREIGN PATENT DOCUMENTS 244908  2/1966  Fed. Rep. of Germany .
244909  2/1966  Fed. Rep. of Germany .

OTHER PUBLICATIONS

Brockhaus Enzyklopadie, p. 718, 1971.

*Primary Examiner*—Arthur C. Prescott
*Attorney, Agent, or Firm*—Herbert Dubno; Jonathan Myers

[57] ABSTRACT

The process for recovering vegetable oleaginous substances from oil-containing natural substances comprises a series of continuous combined pressing and extraction steps to increase and simultaneously to guarantee a high quality product for different kinds of natural substance starting materials. This is accomplished by subjecting the natural substances, conditioned and comminuted if necessary, after mixing with a solvent phase containing some oil to an intensive processing, mixing and extraction in the shear field of at least one rotor-stator unit and subsequently feeding the resulting liquid phase, through a filter if necessary, to a distillation column. The solid phase is extracted in successive stages until a residual oil content of 1% is reached and the solvent is fed back to a solid phase in a counterflow. The process as defined in my invention is universally applicable to all fat and oil-containing natural substances using suitable fluid extraction means. An apparatus for performing this process is also provided. A variety of rotor-stator assemblies are provided for the rotor-stator unit as defined in the nature of the natural substances being processed.

2 Claims, 2 Drawing Sheets

PROCESS AND APPARATUS FOR RECOVERING VEGETABLE FATS AND OILS FROM OIL-CONTAINING NATURAL SUBSTANCES

This is a continuation of co-pending application Ser. No. 07/593,303 filed on Oct. 3, 1990 now abandoned, which is a continuation of Ser. No. 07/254,386 filed Oct. 5, 1988 now abandoned.

FIELD OF THE INVENTION

My present invention relates to a process and apparatus for recovering vegetable fats and oils from oil-containing natural plant substances, especially oil-bearing seeds and fruits.

My invention particularly relates to a process and a apparatus for recovering vegetable fats and oils from natural substances whereby the natural substances are mixed with a solvent, extracted, fats and/or oils are separated from the solvent, and the solvent is recirculated or recovered.

BACKGROUND OF THE INVENTION

To obtain vegetable fats and oils from oil-containing fruits and seeds both continuous and discontinuous processes are used.

According to the kind of natural product before the actual oil recovery process is performed, a husking or shelling can be necessary since the quality of the oil can be considerably reduced by shell-specific material (e.g. wax) which can appear in the oil on extraction with the solvent.

The conventional pressing frequently employed with fat-rich fruits and seeds is very cost intensive and has lost considerable importance although in a single pressing process a residual fat content of 4% in the pressed residue is attainable. Today processes for continuously recovering oil usually comprise a combination of pressing and extraction with a solvent. First the oil-containing natural materials are subjected to a preliminary pressing to a fat content of about 25% and then extracted to a residual content of 1%. With oil-bearing seeds whose fat content is about 20%, direct extraction is performed without preliminary pressing.

With many plant raw materials a preliminary mechanical treatment involving comminuting or grinding up into smaller pieces is necessary to destroy as much as possible of the storage tissue to attain a high yield. Usually the seeds are subjected to a pressing process after a conditioning. They are moistened and preheated in a unit provided expressly for this purpose.

By this preliminary treatment the oil flows more readily (with a lower viscosity) and separates better on pressing. Moreover a further coagulation of the protein is attained and undesirable enzyme systems and microorganisms are inactivated at temperatures over 80°. With cotton seeds there is also a disinfecting action of the conditioning.

Continuously operating straining screw presses, whose operating principles can be found in the appropriate literature, also are used in the processes described in European Patent 0 129 739 and European Open Patent Application 0 187 877. They are generally used currently in processing heavy oil-bearing seeds and fruits. Working comparisons have clearly shown that in principle a certain screw design or structure only yields optimum results with seed sorting. Different crops require different processing conditions which forces a considerable compromise between quality and operating requirements.

As an extraction medium an industrial grade n-hexane fraction with a boiling range between 55° and 70° C. is generally currently used. For a few special cases, however, other solvents are used. Moreover processes are known, e.g. from German Open Patent Application 2 127 596 and the cited European Patent Document 0 187 877 A1, in which the fat or oil is extracted with supercritical gases.

Solvent separation occurs from the crude oil comparatively easily at temperatures under 100° C. and in vacuum. The residual content of oil in the solvent is under the current analytical detection limit. The solvent is driven out from the solid extraction residue usually with steam.

Despite many attempts it has not been possible to optimize the combination of pressing and solvent extraction in continuous processing and also it has not been possible to obtain satisfactory end product processing in a given plant or unit for a variety of oil-bearing seeds and fruits.

OBJECTS OF THE INVENTION

It is an object of my invention to provide an improved process and apparatus for recovering vegetable fats and oils from oil-containing natural substances which are more economical for a variety of natural substances than the processes and apparatuses currently used.

It is also an object of my invention to provide an improved process and apparatus for recovering vegetable fats and oils from oil-containing natural substances which not only are more economical but which also guarantee a satisfactory product quality despite the type of natural substance being processed.

SUMMARY OF THE INVENTION

These objects and others which will become more readily apparent hereinafter are attained in accordance with my invention in a process for recovering vegetable fats and oils from natural substances in which the natural substances are mixed with a solvent, extracted and subsequently the fats and/or oils are separated and the solvent is recirculated.

According to my invention the natural products are mixed with a solvent phase obtained in the process to form a mixture and the mixture is fed into the shear field of at least one rotor-stator unit for intensive processing, mixing and extraction in which the solvent phase takes up the oils and/or the fats from the solid phase. The solvent containing the oils and/or the fats and the solids from a suspension leaving the rotor-stator unit are separated in a subsequently connected separator and subsequently the solvent is removed in a distillation column from the oils and/or the fats.

By the intensive treatment of the mixture of the natural products and the solvent in the shearing field of a rotor-stator unit in many cases a preliminary comminuting or similar conditioning can be omitted. This has the advantage that the danger of overheating connected with this type of conditioning can be avoided. This overheating can lead to an impairment in the nutrient valve of the pressed cake and in the color and taste characteristics of the oil which results in a considerably increased expense in subsequent raffination and bleaching of the oil. Also the oil yield can be considerably poorer, especially at higher moisture content.

I can use hexane as the solvent and/or extraction means for the process according to my invention, although other solvents, e.g. ethanol, isopropanol, methylene chloride, among others, can be used with certain oil-containing natural substances.

The advantage of the process according to my invention for recovering oil from oil-bearing seeds and oil-containing fruits is based on the fact that in the rotor-stator unit a combination of extraction with solvent and simultaneous preparation of the oil-bearing seeds and oil-containing fruits (by cell breakdown) until cell decomposition nearly occurs so that the principle of extreme diffusion path length reduction providing for a short, intracellular material transport is used.

This cell breakdown occurs by a strong dispersion of the oil-containing solid particles from the destroyed, oil-carrying seeds and fruit cells and there is thus a constant boundary surface renewal with an optimization of the concentration gradient between the oil and the oil-receiving solvent phase as is important for the solubilization of the oil in the solvent.

That is, the extraction process takes place simultaneously with the decomposition and the dispersion of the oil-containing seeds or fruit flesh pieces. A substantially shorter total process time results.

Advantageously the process is controlled so that the extraction occurs in the rotor-stator unit in a temperature range between room temperature and a few degrees below the boiling point.

Also when in many cases a comminuting and conditioning is not required in the process according to my invention, it can be important according to the quality or type of the seeds or fruit meat to be processed, before starting the process described previously, to provide a preconditioning and/or a possible comminution of the substances.

The process according to my invention permits both heat treatment required for conditioning of the oil-containing seeds and fruits and a partial grinding up or cell destruction to be carried out in a connected rotor-stator unit with suitably formed rotor-stator assemblies.

For the heating or heat treatment a feed of hot steam into the natural substances can be effected directly through the stator elements at suitable places or before the actual feed of the natural substances into this dispersion and extraction unit. The process according to my invention can understandably be used for treatment of the pressed oil-containing seeds and fruits with considerable advantage.

It can be particularly advantageous that mixing and-/or subsequent processing and extracting occurs continuously in one or more stages and a solvent phase containing some oil is fed in a counterflow to the solids. Thus the solid phase is subjected to an intensive treatment, mixing and extraction in continuous processes in individual connected extraction stages with solvent containing oil fed back in a counterflow. It is thus possible to optimize the concentration gradient for each stage and to enrich the solvent phase with oil in stages.

The residual solvent from the solid phase in the last extraction stage is advantageously removed by heat treatment, liquefied in a condenser and fed back into the solvent cycle. The removal of the residual solvent happens advantageously at ambient pressure and at temperatures under 100° C. The return of the residual solvent occurs advantageously together with the pure solvent from the distillation stage to the mixer of the last stage. However understandably it can also be fed back to other locations according to the requirements of the process.

In cases in which the suspension issuing from the first rotor-stator unit has a high fraction of fine particles, for reliable and trouble-free operation of the distillation column, an oil-containing liquid phase from the first separator can be filtered to separate the finely divided solid particles before feeding them to the distillation column, and in the case of a multistage treatment, the filter cake from the filtration step can be delivered to one of the mixers in a subsequent stage.

An apparatus in which simultaneous treatment, mixing and extraction occurs which is especially suited to performing the process according to my invention and which also satisfies some of the aims of my invention can comprise a mixer with feed means for oil- or fat-containing natural substances which is connected by a pipe with a rotor-stator unit whose outlet is connected by another pipe with a separator.

The separator outlet for the liquid phase from the separator is connected with a distillation column by still another pipe. In the rotor-stator unit the force acting on the oil-containing cells for their decomposition is the result of both a purely mechanical action of a specially designed rotating element against a similarly appropriately designed stationary opposing piece and also by action of the solvent itself.

The rotor-stator unit in which the extraction also occurs as well as the decomposition and dispersion of the oil-containing seeds and fruit meat or flesh pieces thus can be characterized as a homogenizing and extraction unit operating with a rotor-stator unit in which different rotor-stator assemblies can be used according to the requirements in regard to the structure and operation and indeed in all stages in case of a multistage process.

It can be significant according to the natural raw material to be processed when a conditioning and possibly comminuting of the starting material is effected before running the above-described process according to my invention.

An additional rotor-stator unit with a suitably constructed rotor-stator assembly is provided in the apparatus. In this rotor-stator unit a partial pulverizing like the heat treatment required for conditioning of the oil-containing seeds and fruits is possible so that for heat treatment the input of hot steam in the natural product can be effected directly through the stator element of the rotor-stator unit at suitable locations or can be effected in this dispersion and extraction unit before the actual introduction of the natural product.

Advantageously the choices among the different rotor-stator assemblies vary according to the product to be processed. The following tool types are available and can be exchanged with each other in the rotor-stator unit when the product is changed without special effort.

For comminuting an interlocking conical rotor-stator assembly designated as a cone tool provided with elongated grooves oriented radially can be used. The gap width between the conical rotor and the similarly conical stator can be adjusted as desired to provide a certain desired seed and/or fruit flesh particle size. Even in this rotor-stator assembly there is an intimate mixing with the solvent (e.g. hexane).

Furthermore a rotor-stator assembly made from a plurality of concentric rings can be used in which the concentric rings of rotor and stator are provided with radial slots and are interlocking. In this assembly, which is called a chamber tool the oil-containing natural substances are jointly delivered with the solvent in the middle of the rotor-stator assembly. The centrally delivered slurry made from the natural material and the solvent is subjected to pressurization by the centrifugal force of the rotor which forces the dispersion radially to the outlet located on the periphery of the unit.

On its way through the rotor-stator assembly the individual particles of the slurry are subjected to the action of the frictional forces, shear and tangential stresses. Moreover the discrete volumes of the slurry on the way through the narrow ducts of the chamber tool experience extreme direction changes and accelerations which, depending on the speed of the rotor and the number of radial slots in it, lead to high frequency microcavitation in the discrete volume of the slurry and thus to cell rupture of the oil-containing cells.

Further, an intimate mixing of the solid particles and the solvent occurs and thus an extreme improvement of the solution kinetics in the extraction process.

Another rotor-stator assembly, an orifice and/or nozzle tool, is constructed with additional concentric cylindrical surfaces in which radial passages are provided. The passage size is designed according to fluid mechanics so that the slurry passing through as in a nozzle flow is accelerated so strongly that the slurry stream is divided and dispersed in many extremely small discrete droplets from the slurry located upstream of it. This has the advantage that the previously formed agglomerates of oil-containing solid particles are destroyed and thus a boundary surface renewal with an optimum material exchange or replacement in regard to the oil transport by the solid particles is attained in the solvent.

Examples of the process and apparatus of my invention are provided in the following detailed description and accompanying drawing. However, my invention is not intended to be limited to the details provided below and it will be understood that various omissions, modifications, substitutions and changes in form and detail are possible. Particularly, conveying, measuring and control systems and their combinations which are conventional in the art have not been described in detail.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
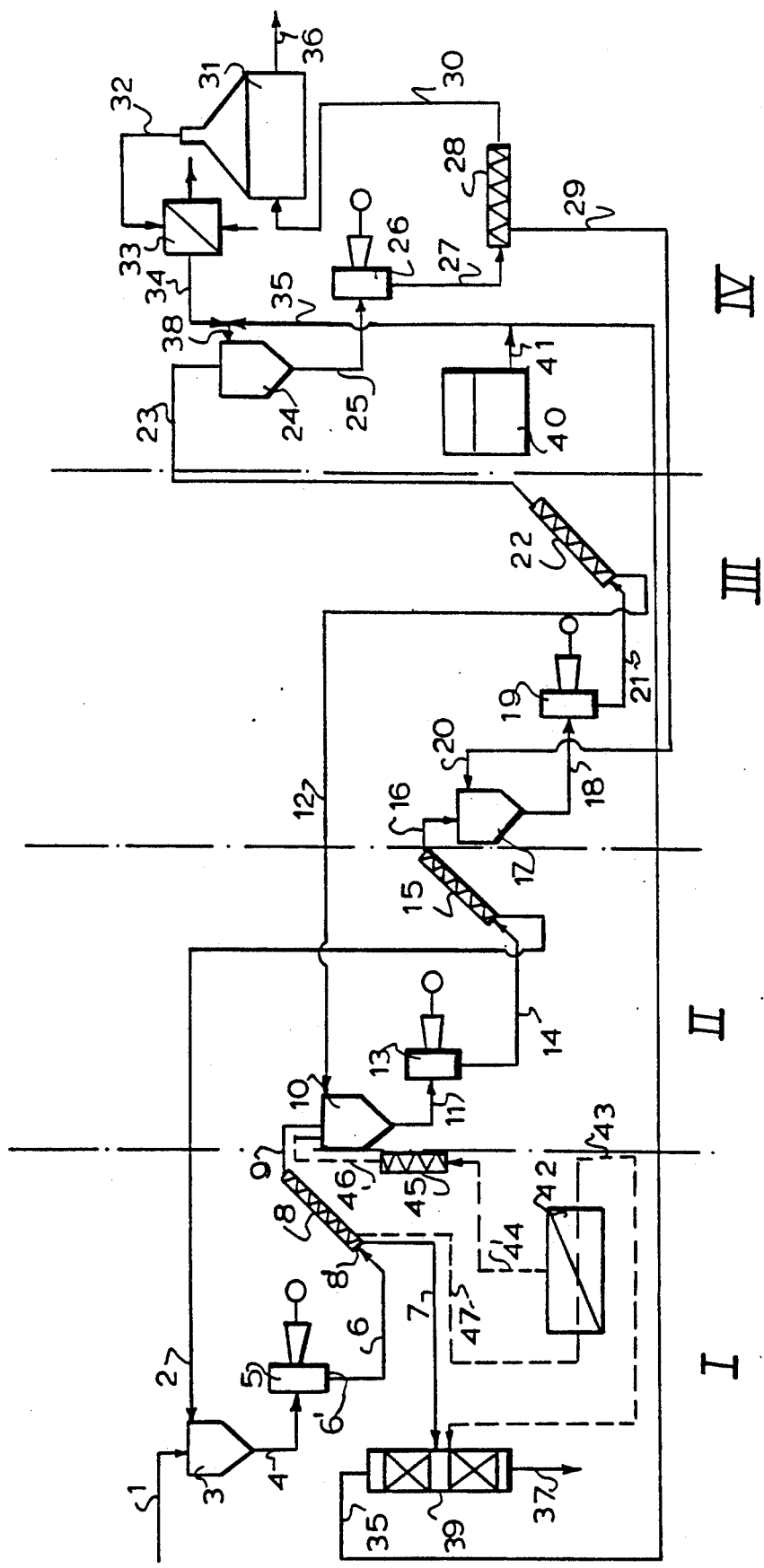
FIG. 1 is a flow diagram of the apparatus for recovering fats and oils according to my invention.

FIG. 1 shows a multistage process for recovering vegetable oil and fat from natural substances comprising four stages I, II, III and IV.

The oil-containing natural products in the form of oil-bearing seeds or oil fruits—either subjected to a preliminary treatment or not—are fed in a first stage I to a funnel-like mixer 3 by a feeder 1 and there they are mixed with a solvent partially containing oil which reaches the mixer 3 from a separator 15 in a second stage II through the feed duct 2.

The mixture is fed to the homogenizing and extracting unit 5 operating according to the rotor-stator principle through the pipe 4 where the solvent phase containing some oil receives more oil up to a certain maximum amount which is removed from the solids or the solid phase.

For separation of the solid and the solvent phase, the solid solvent mixture is fed from rotor-stator unit outlet 6' by the pipe 6 to a separator 8 in the first stage I for gross separation of the solids and the solvent. In an actual case this separator 8 usually comprises a straining screw conveyor so that simultaneously with the solid-liquid separation the feed of the solid occurs. The solvent phase with the maximum possible oil content is fed from the separator outlet 8' through the pipe 7 to a distillation column 39 which is operated as a vacuum distillation column for separation of the supplied oil and solvent.

The oil is taken off the distillation column 39 through the pipe 37. The pure solvent which leaves the distillation column 39 as a head product by the pipe 35 is fed to the final mixer 24 in the fourth stage IV as a pure solvent phase freed from all oil.

Depending on the nature of the oil-containing natural substances used because of the fraction of fine particles in the solvent phase containing oil issuing from the separator 8, the necessity may arise to feed this solvent phase through a pipe 47 to a filter 42 in which it is freed from the finely divided solid fraction present before further processing in the distillation column 39.

The dense oil-containing filter cake is continuously taken from the filter 42 through a pipe 44 by a conveying unit 45 comprising a screw conveyor. The filter cake material is then fed through the pipe 46 to the mixer 10 where it is subjected to an additional extraction process. In the following straining screw conveyor or separator 15 it forms an agglomerate with the gross solid materials and follows the path of these solid materials through the subsequent process stages. It leaves the process at 36 in a final stage together with the extract residue.

The solid phase partially de-oiled in the first stage I is fed to the mixer 10 through the pipe 9 and there premixed with the oil containing solvent from the separator 22 which is also a straining screw conveyor through the pipe 12.

The slurry is then fed for the purpose of intensive mixing, processing and extraction over the pipe 11 to the second homogenizing and extracting unit operating according to the rotor-stator principle.

This rotor-stator unit 13 is connected to a following separator 15 which is also a straining screw conveyor which is supplied through the feed pipe 14 with the slurry intimately exchanging material and a separation of the solvent phase containing the oil and the solids is performed.

The subsequent additional extraction stage III corresponds to those previously described and utilizes a feed pipe 16, mixer 17, pipe 18, rotor-stator unit 19, feed pipe 20 and pipe 21 over which the mixture of solid and solvent phase is fed to the downstream separator 22.

The final mixer 24 in the last stage IV is fed the solid phase already largely de-oiled through the feed pipe 23.

The principal flow coming from the distillation column 39 through the pipe 35 is combined together with the partial flow coming from the condensor 33 through the pipe 34 into a total solvent phase flow and is fed through the pipe 38 to the mixer 24. From there the slurry is fed through the pipe 25 to the rotor-stator unit 26.

The slurry is fed through the pipe 27 to the separator 28 which operates according to the principle of a straining screw conveyor like the other separators 8, 15 and 22. Here a further separation of solid and partially loaded solvent phase occurs.

The liquid phase partially containing oil is taken off through the pipe 29 and is fed in a counterflow to the solid flow to stage III immediately downstream of the stage IV containing the separator 28. For example the quasi-de-oiled solids (oil content about 1%) are fed through a pipe 30 to a solvent remover 31, advantageously a fluidized bed evaporator, in which the solvent (e.g. hexane) dissolved in the solids is removed by heating and is fed through pipe 32 so that it can be recovered by condensation in the condensor 33 and is then recycled through the pipe 34 to the solvent cycle. The dried solids are taken off through the pipe 36.

In this process leakage and other solvent losses depending on the production details are compensated by the addition of solvent from a solvent reservoir 40 through the pipe 41.

Figure 2:
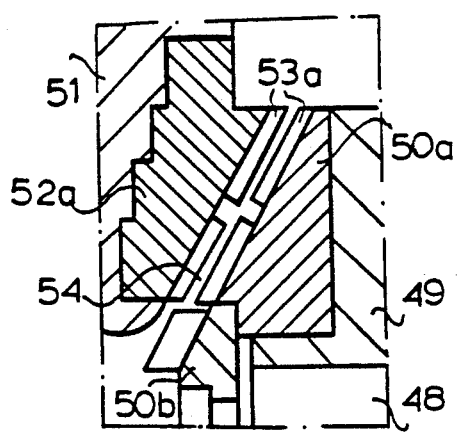
FIG. 2 is a cross sectional view through a conical tool for a rotor-stator unit.
Figure 3:
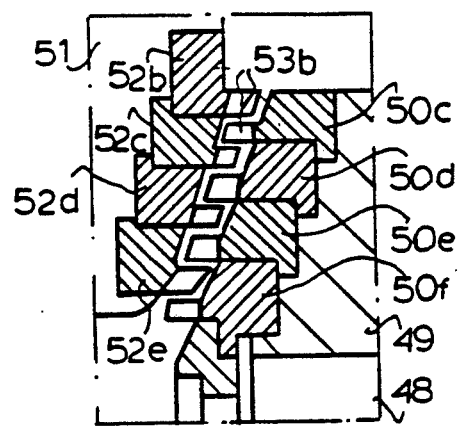
FIG. 3 is a cross sectional view through a chamber tool for a rotor-stator unit.
Figure 4:
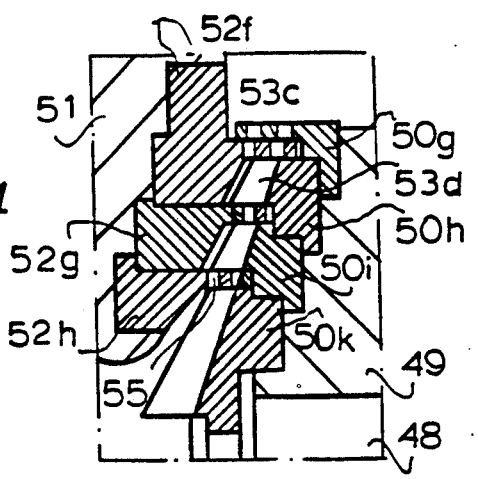
FIG. 4 is a cross sectional view of a nozzle or orifice tool for a rotor-stator unit.

In FIGS. 2 to 4 examples of the rotor-stator assembly are illustrated for applications corresponding to the requirements which result from different natural products and different product steps. A rotor 49 which carries the rotor ring or rings 50 is attached to a rotor shaft 48.

These rings 50 are mounted interlocking or facing each other adjacent the stator rings 52 mounted in the stator 51, The actual tool 53 and/or 54 which forms the shear region of the rotor-stator assembly acts between the rotor ring 50 and the stator ring 52.

In the case of the cone tool of FIG. 2 the rotor-stator assembly is basically conical. The tool elements 53 do not have interlocking elements but they simply face each other and a variable gap 54 can be provided by axial sliding, e.g. axial sliding of the stator.

The rotor-stator assembly is still formed basically conically in the chamber tool illustrated in FIG. 3, however the tool elements 53b on the rotor and/or stator rings 50c to 50f and/or 52b to 52e forming the shear field interlock in each other. Thus properties deviate from those of the cone tool of FIG. 2 according to the purpose of the application.

Also in the nozzle and/or orifice tool shown in FIG. 4 the tool elements 53c and/or 53d on the rotor-stator rings 50g to 50k and/or 52f to 52h engage in each other like rings so that the rotor-side tool elements 53d also have recesses, however the stator-side tool elements 53c are also provided with passages 55. Also the most exterior rotor ring 50g is provided with passages 55. The special properties of these rotor-stator assemblies result from the nozzle or orifice action of these passages 55.

Figure 5A:
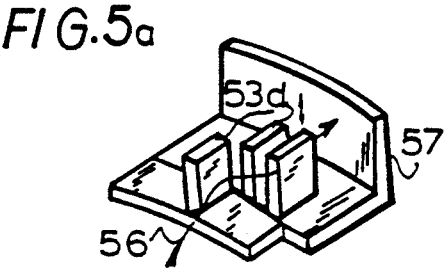
FIG. 5a is a perspective view.
Figure 5B:
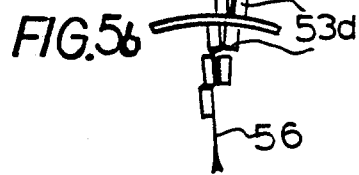
FIG. 5b is a diagrammatic top view and FIG. 5c is a diagrammatic top view of the tool structure of a rotor-stator assembly and the path of the particles.

The path of particles 56 in a rotor-stator assembly is illustrated in FIGS. 5a and 5b. The individual pieces of material are accelerated, retarded and guided many times on their path 56 and/or 59 from the interior to exterior through the tool elements 53d. The high crushing, dispersing and extracting performance of the rotor-stator unit for recovering oil is based on these detailed features. Residual still-existing agglomerations are further divided on impinging on the housing wall 57.

Figure 5C:
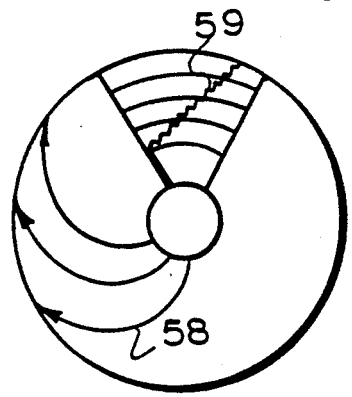

In FIG. 5c the course 58 of the particles in a conventional rotor-stator unit are illustrated in contrast to the path 59 of the particles in a rotor-stator assembly in a unit according to my invention.

I claim:

1. A process for recovering oil from a natural product selected from the group which consists of oil-bearing seed and oil-bearing fruit, comprising the steps of:
   (a) comminuting and conditioning said natural product to facilitate release of oil therefrom;
   (b) in a first stage, decomposing the natural product comminuted and conditioned in step (a) in the presence of a solvent capable of solvent-extracting said oil from said natural product and being separable from extracted oil by distillation by subjecting a mixture of the natural product from step (a) and said solvent previously charged with the oil from a successive stage to a conical shear field formed between tool parts projecting toward one another of a rotor and a stator of at least one rotor-stator unit generating a multiplicity of shear actions as said rotor is rotated relative to said stator and said mixture moves outwardly to decompose said natural substance into fine particles and extracting oil into a solvent phase formed by said solvent and the oil extracted thereby;
   (c) in said first stage, separating a solid phase from a dispersion of solid particles in said solvent phase;
   (d) filtering said solid particles from said dispersion to form a solvent phase free from said particles;
   (e) distilling said solvent phase subsequent to filtering in step (d) to yield said oil and a solvent substantially free from said oil;
   (f) in a second stage, further decomposing the solid phase separated in step (c) and solid particles filtered in step (d) in the presence of said solvent by subjecting a mixture of solids from steps (c) and (d) and said solvent previously charged with the oil from a successive stage to a conical shear field formed between tool parts projecting toward one another of a rotor and a stator of at least one rotor-stator unit generating a multiplicity of shear actions as the latter rotor is rotated relative to the respective stator and the respective mixture moves outwardly to extracting oil into a the respective solvent;
   (g) in said second stage, separating solids from the respective solvent and feeding the respective solvent containing oil to said unit of said first stage;
   (h) in a third stage, further decomposing the solids separated in step (g) and subjecting a mixture of solids from step (g) and said solvent previously charted with the oil from a successive stage to a conical shear field formed between tool parts projecting toward one another of a rotor and a stator of at least one rotor-stator unit generating a multiplicity of shear actions as the latter rotor is rotated relative to the respective stator and the respective mixture moves outwardly to extracting oil into the respective solvent;
   (i) in said third stage, separating solids from the respective solvent and feeding the respective solvent containing oil to said unit of said second stage; and
   (j) in a fourth stage, further decomposing the solids separated in step (i) and subjecting a mixture of solids from step (i) and said solvent from distillation in step (e) to a conical shear field formed between tool parts projecting toward one another of a rotor and a stator of at least one rotor-stator unit generating a multiplicity of shear actions as the latter rotor is rotated relative to the respective stator and the respective mixture moves outwardly to extracting oil into the respective solvent; and (k) in said fourth stage, separating solids from the respective solvent and feeding the respective solvent containing oil to said unit of said third stage.

2. The process defined in claim 1 wherein said solvent is selected from the group which consists of hexane, ethanol, isopropanol and methylene chloride.

* * * * *